Sept. 19, 1961  H. T. WHITE  3,000,322
MOTOR DRIVEN PUMP
Original Filed Aug. 27, 1957  2 Sheets-Sheet 1

INVENTOR.
HOWARD T. WHITE
BY
ATTORNEY

Sept. 19, 1961 H. T. WHITE 3,000,322
MOTOR DRIVEN PUMP
Original Filed Aug. 27, 1957 2 Sheets-Sheet 2

INVENTOR.
HOWARD T. WHITE
BY
ATTORNEY

United States Patent Office 3,000,322
Patented Sept. 19, 1961

3,000,322
MOTOR DRIVEN PUMP
Howard T. White, Melrose Park, Pa., assignor to Fostoria Corporation, Fostoria, Ohio, a corporation of Ohio
Original application Aug. 27, 1957, Ser. No. 680,448. Divided and this application June 30, 1959, Ser. No. 824,019
8 Claims. (Cl. 103—118)

This invention relates to motor driven pumps and more particularly to pumps for gases at high pressure.

It is the principal object of the present invention to provide a motor driven pump for the pumping of fluids and particularly high pressure gases having an improved motor stator construction and an improved pump stator and pump rotor construction.

It is a further object of the present invention to provide a motor driven pump in which the motor stator is isolated from the motor rotor and also from the fluid being pumped.

It is a further object of the present invention to provide a motor driven pump for the pumping of gases which must be maintained free from contamination and particularly contamination by hydrocarbon lubricants.

It is a further object of the present invention to provide a motor driven pump in which provisions are made for the introduction of a purging gas which will not pick up and intermingle with the fluid being pumped any hydrocarbon lubricants for the bearings.

It is a further object of the present invention to provide a motor driven pump of the character aforesaid in which simple but effective provisions for cooling the motor stator are provided.

It is a further object of the present invention to provide a motor driven pump having improved provisions for lubrication.

Other objects and advantageous features of the invention will be apparent from the description and claims.

The nature and characteristic features of the invention will be more readily understood from the following description, taken in connection with the accompanying drawings forming part thereof, in which:

FIG. 2 is an end elevational view taken approximately on the line 2—2 of FIG. 1;

FIG. 3 is a transverse sectional view taken approximately on the line 3—3 of FIG. 1;

FIG. 4 is a fragmentary transverse sectional view taken approximately on the line 4—4 of FIG. 1;

FIG. 5 is a fragmentary transverse sectional view taken approximately on the line 5—5 of FIG. 1;

FIG. 6 is a transverse sectional view taken approximately on the line 6—6 of FIG. 1; and FIG. 7 is a transverse sectional view taken approximately on the line 7—7 of FIG. 1.

Figure 1:
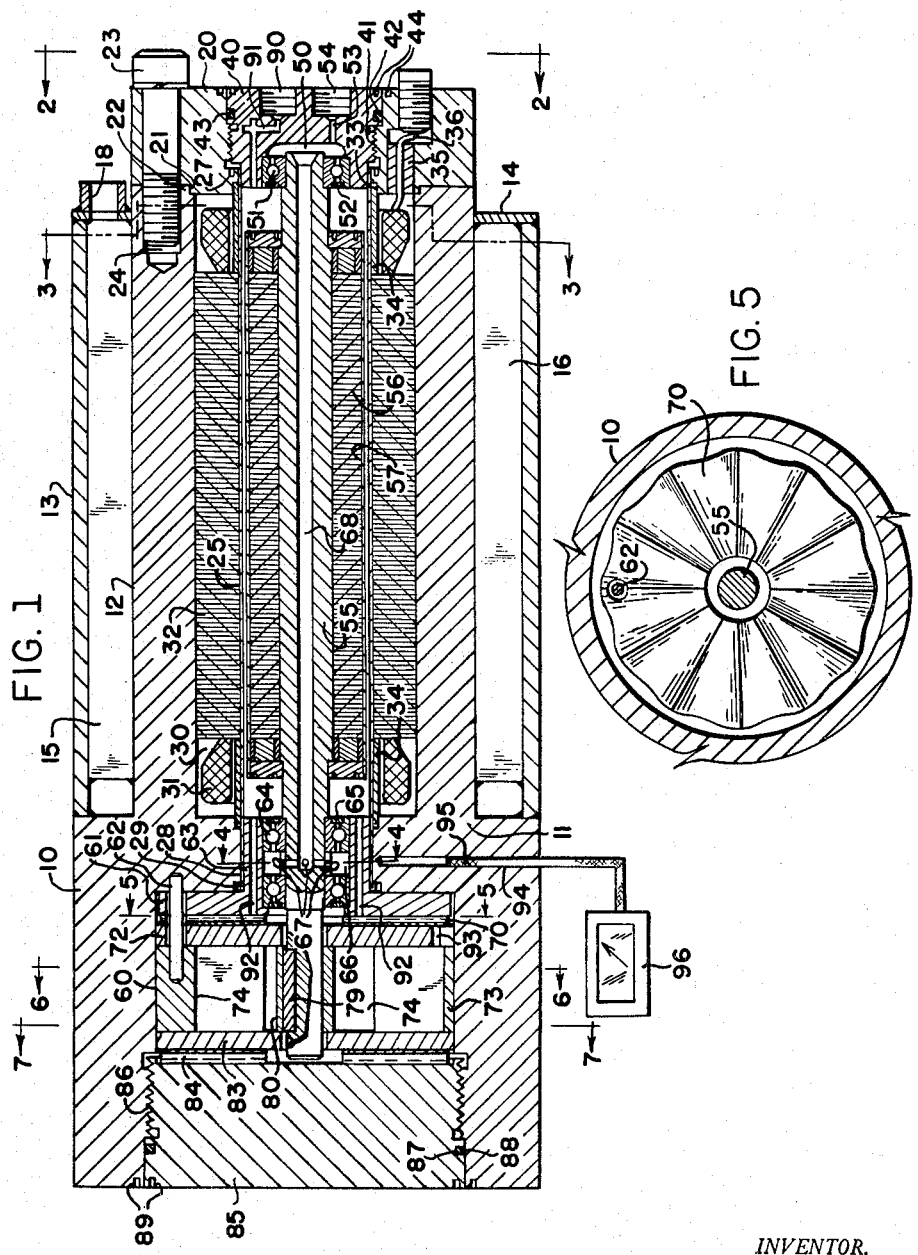
FIGURE 1 is a longitudinal central sectional view of a motor driven pump in accordance with the present invention.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings, the motor driven pump in accordance with the present invention preferably includes a generally cylindrical pump housing section 10 of a wall thickness to accommodate the pressures of the fluid being pumped and having a transverse wall 11 also of suitable thickness. Extending from the wall 11 and preferably rigidly secured thereto or integral therewith a hollow cylindrical inner motor housing section 12 is provided, also of suitable thickness to withstand the fluid pressures of the fluid being pumped.

An outer cylindrical motor housing section 13 is provided in spaced relation to the inner housing section 12 and is secured at its inner end to the wall 11. At the outer end of the housing section 12, an end closure plate 14 is provided welded or otherwise secured thereto and to the housing section 12 and closing the end of the housing section 13.

Within the space between the inner housing section 12 and the outer housing section 13 a pair of diametrically oppositely disposed baffles 15 and 16 are provided extending from the end closure plate 14 and terminating in spaced relation to the wall 11 to provide passages around the inner ends thereof. In the end closure plate 14 inlet and outlet connections 17 and 18 are provided on opposite sides of the upper baffle 15 for the supply to and delivery of cooling fluid for the interior cooling space enclosed within the outer housing section 13.

An end closure wall 20 is provided, at the outer end of the housing section 12 and has a groove 21 for engagement by a shoulder 22 on the housing section 12. The end closure wall 20 is secured in position with respect to the inner housing section 12 by a plurality of studs 23 which extend into blind threaded holes 24 in the housing section 12.

A hollow cylindrical sleeve 25 of non-magnetic material, such as stainless steel, is provided. The sleeve 25 extends into and is welded to the end closure wall 20, the wall 20 having an annular welding groove 27 therein to facilitate the welding. The sleeve 25 also extends through a central opening 28 in the wall 11 and is welded in place, an annular welding groove 29 being provided for this purpose.

The space between the sleeve 25, the housing section 12, the wall 11 and the end closure wall 20 provides an interior isolated motor stator chamber 30 within which the motor windings 31 and field laminations 32 are disposed. The field laminations 32 are in engagement with the inner surface of the housing section 12 and with the sleeve 25 and aid in supporting and reinforcing the sleeve 25.

In the spaces between the laminations 32 and the wall 11 and the laminations 32 and the end closure wall 20 and extending into annular grooves 33, pressure rings 34 are provided in engagement with the exterior of the sleeve 25 for reinforcing the sleeve 25 against the effect of internal pressure in the sleeve 25. The rings 34 are preferably of high yield strength material.

The end closure wall 20 is provided with a seal 35 through which conductors 36 extend for supplying electric energy to the motor stator windings 31.

The end closure wall 20 is provided with a closure plug 40, of suitable thickness in accordance with the fluid pressures to be accommodated, preferably in threaded engagement therewith as at 41. The closure plug 40 is provided with a circumferential groove 42 for the reception of a sealing ring 43, such as an O-ring, for purposes of testing and at the outer face thereof is welded or otherwise secured in fluid tight relation to the end closure wall 20, welding grooves 44 being provided to permit of the annular welding.

The end closure plug 40 has a reduced inner end which extends into the sleeve 25.

The end closure plug 20 is preferably provided with a chamber 50 within which a bearing 51, shown as a ball bearing, is mounted with an inner seal 52 for preventing the delivery of lubricant therefrom. The chamber 50 is in communication through a passageway 53 with a lubricant supply connection 54 for the supply of lubricant thereto, as desired and required.

The bearing 51 serves as a support for one end of a shaft 55 on which a motor rotor 56 is secured interiorly of the sleeve 25 and of the field laminations 32. The motor rotor 56 can be of any desired type, a laminated short circuited type being suitable. The motor rotor 56 is preferably provided with an enclosure 57 of corrosive or erosive resistant sheet material, stainless steel being suitable for some purposes.

The pump housing section 10 has an opening 60 therein, concentric with the longitudinal axis of the shaft 55 and a circular inner end plate 61 is mounted therein and held against rotation by a longitudinally axially extending pin 62 in engagement with the wall 11. The plate 61 has a collar 63 extending therefrom and through the wall 11. The collar 63 has mounted therein, for the support of the shaft 55, spaced bearings 64, preferably ball bearings, having seals 65 at the opposite and outer ends thereof for preventing the escape of lubricant and with an open space 66 therebetween in the interior thereof which is in communication through radial passageways 67 and a longitudinal passageway 68 in the shaft 55 with the chamber 50 in the end closure plug 41. Lubricant can be supplied from the chamber 50 to the bearings 64.

Within the opening 60 in engagement with the plate 61 and held against rotation by the pin 62 passing therethrough a radially corrugated disc 70 of spring metal or the like is provided which serves as a spring as hereinafter explained and has the inner margin thereof spaced from the shaft 55. In engagement with the disc 70, a bearing disc 72 is provided, preferably of carbon. Extending longitudinally outwardly from the disc 72, a pump housing liner ring 73 is provided having a central opening 74 eccentric with respect to the longitudinal axis of the shaft 55. The ring 73 is provided with an inlet port or opening 75 in communication with an inlet connection 76 on the pump housing section 10 and with a discharge port or opening 77 in communication with a delivery connection 78 on the pump housing section 10. The ring 73 is held against rotation by the pin 62 in engagement therein.

Within the ring 73, and secured to the shaft 55 by a key 79 and slidable axially therealong, a pump rotor 80 is mounted. The pump rotor 80 has mounted in radial slots 81 therein a plurality of slidable vanes 82 for engagement with the eccentric opening 74. The rotor 80 engages the bearing disc 72 and a slight side clearance can be provided between the vanes 82 and the disc 72. The ring 73 and the rotor 80 are preferably both made of a material, including metal, having the same temperature coefficient of expansion.

In engagement with the ring 73 and the rotor 80 a bearing disc 83 is provided, preferably of carbon, and similar to the disc 72. Outwardly of and in engagement with the disc 83, a radially corrugated disc 84 is provided, similar to the disc 70.

The outer end of the pump housing section 10 is closed by a pump housing end closure plug 85, of suitable thickness to accommodate the pressure of the fluid being pumped. The plug 85 is preferably in threaded engagement with the housing section 10, as at 86, and is provided with an annular groove 87 for the reception of a packing ring 88, such as an O-ring, for sealing the plug 85 for testing. The end faces of the housing section 10 and the plug 85 are preferably provided with annular welding grooves 89 for welding the plug 85 in place and sealing it at this location.

In order to provide a positive pressure for purging, and at the same time preventing the carryover of any hydrocarbon lubricant or the like which might escape from the bearings 51 and 64, the end closure plug is provided with a purging fluid supply connection 90 to which a suitable purging fluid, such as hydrogen gas, is supplied under pressure. The supply connection 90 is connected by a passageway 91 to the outer end of the threaded connection 41 and to the interior of the closure plug 40 from which it is delivered through the interior of the sleeve 25. The collar 63 is provided with a plurality of axially extending openings 92 communicating with the space in and around the disc 70. The bearing disc 72 has a plurality of openings 93 connecting that space with the interior of the ring 73 contiguous to the inlet port 75.

The wall 11 may also be provided with a thermal well 94 for the insertion of temperature responsive elements 95 connected to an exteriorly disposed indicating meter 96.

In use, electrical energy supplied through the conductors 36 to the windings 31 sets up a rotating field in the laminations 32 which is effective on the motor rotor 56 for rotating the same. Rotation of the motor rotor 56 is effective for rotating the shaft 55, supported in the bearings 51 and 64. Rotation of the shaft 55 is effective for rotating the rotor 80 and fluid entering at the fluid inlet connection 76 and supplied to the interior of the ring 73 through the inlet port 75 is delivered, by the continuous rotation of the rotor 80 with its vanes 82, for delivery through the delivery port 77 and the fluid discharge connection 78.

The compressive forces applied by the plug 85 against the disc 84 and through the bearing disc 83 are also transmitted through the ring 73 and the bearing disc 72 to the disc 70.

The longitudinally resilient discs 70 and 84 will serve to distribute between themselves the compressive forces thus applied so that the rotor 80 and ring 73 have a floating action with the wear on the bearing discs 72 and 83 equalized.

Purging fluid supplied at the supply connection 90 and delivered, as previously pointed out, through the passageways 93 to the interior of the ring 73 contiguous to the inlet port 75 can be utilized to applying positive pressure thus preventing backward movement of fluid towards the motor rotor chamber within the sleeve 25. At the same time, by the use of a suitable purging fluid which is not a solvent for or carrier of the lubricant used for lubricating the bearings 61 and 64, any material which may be within the motor rotor chamber or communicating parts is not transferred to the pump chamber within the ring 73.

Lubricant can be supplied from time to time as desired through the supply connection 54 for lubricating the bearings 51 and 64.

The pump heretofore described is suitable for use for line pressures from 150 p.s.i. up to 10,000 p.s.i. without any likelihood of leakage or contamination of the fluid being pumped.

The motor stator can be cooled by the supply of cooling liquid delivered to the cooling fluid connection 17 and discharged through the cooling fluid connection 18 and passing over the exterior of the housing section 12 and around the inner ends of the baffles 15 and 16.

This application is a division of application Serial No. 680,448, filed August 27, 1957, now abandoned.

I claim:

1. A motor driven pump having an elongated unitary housing with a first longitudinal bore extending inwardly from one end, a second longitudinal bore extending inwardly from the opposite end, said bores terminating at and being separated by an integral radially inwardly extending interior wall, said first bore providing a motor housing section, an end closure wall with a central closure member therein for closing the outer end of said first bore, a longitudinally axially extending cylindrical sleeve connecting said interior wall and said closure wall and providing with said first bore an isolated motor stator chamber, motor stator windings and field laminations in said motor stator chamber, a longitudinally axially disposed shaft interiorly in said sleeve and extending through said interior wall and into said second bore, bearings for said shaft in said interior wall and in said central closure member, said second bore having a pump rotor chamber therein and fluid inlet and delivery connections in communication with said pump rotor chamber, and a pump rotor on said shaft in said pump rotor chamber for delivering fluid from said fluid inlet connection to said fluid delivery connection.

2. A motor driven pump as defined in claim 1 in which said closure wall and said closure member have portions in threaded engagement.

3. A motor driven pump as defined in claim 1 in which said closure wall and said closure member have portions in threaded engagement, and an annular packing is interposed between said closure wall and said closure member outwardly of said portions.

4. A motor driven pump as defined in claim 1 in which said closure wall and said closure member have portions in threaded engagement, and said closure wall and said closure member have a welded pressure tight joint therebetween.

5. A motor driven pump as defined in claim 1 in which said closure wall has a closure member in threaded engagement therein, said shaft has a passageway therein communicating with one of said bearings, a lubricant supply connection is provided in said closure member, and connections are provided from said lubricant supply connection to said passageway.

6. A motor driven pump as defined in claim 1 in which said closure wall has a closure member in threaded engagement therein, said shaft has a passageway therein communicating with another of said bearings, a lubricant supply connection is provided in said closure member, and connections are provided from said lubricant supply connection to said bearing in said closure member and to said passageway.

7. A motor driven pump having an elongated unitary housing with a first longitudinal bore extending inwardly from one end, a second longitudinal bore extending inwardly from the opposite end, said bores terminating at and being separated by an integral radially inwardly extending wall, said first bore providing a motor housing section, an end closure wall with a central closure member therein for closing the outer end of said first bore, a longitudinally axially extending cylindrical sleeve connecting said interior wall and said closure wall and providing with said first bore an isolated motor stator chamber, motor stator windings and field laminations in said motor stator chamber, a longitudinally axially disposed shaft interiorly in said sleeve and extending through said interior wall and into said second bore, bearings for said shaft in said interior wall and in said central closure member sealed from the interior of said sleeve, said second bore having a pump rotor chamber therein and fluid inlet and delivery connections in communication with said pump rotor chamber, a pump rotor on said shaft in said pump rotor chamber for delivering fluid from said fluid inlet connection to said fluid delivery connection, a purging fluid supply connection in said closure member, and connections including the interior of said sleeve and passageways in said wall and said pump housing for delivering purging fluid to said pump rotor chamber.

8. A motor driven pump having an elongated unitary housing with a first longitudinal bore extending inwardly from one end, a longitudinally extending outer section of reduced diameter exteriorly of said first bore, a longitudinally extending outer housing section in spaced relation to said section of reduced diameter and having longitudinally extending baffles therein, cooling fluid connections on opposite sides of one of said baffles, a second longitudinal bore extending inwardly from the opposite end, said bores terminating at and being separated by an integral radially inwardly extending wall, said first bore providing a motor housing section, an end closure wall with a central closure member therein for closing the outer end of said first bore, a longitudinally axially extending cylindrical sleeve connecting said interior wall and said closure wall and providing with said first bore an isolated motor stator chamber, motor stator windings and field laminations in said motor stator chamber, a longitudinally axially disposed shaft interiorly in said sleeve and extending through said interior wall and into said second bore, bearings for said shaft in said interior wall and in said central closure member, said second bore having a pump rotor chamber therein and fluid inlet and delivery connections in communication with said pump rotor chamber, and a pump rotor on said shaft in said pump rotor chamber for delivering fluid from said inlet connection to said fluid delivery connection.

References Cited in the file of this patent
UNITED STATES PATENTS

| | | |
|---|---|---|
| 1,428,238 | Keating | Sept. 5, 1922 |
| 1,607,383 | Aurand | Nov. 16, 1926 |
| 1,879,625 | Mendenhall et al. | Sept. 27, 1932 |
| 1,896,328 | Pohl | Feb. 7, 1933 |
| 1,954,824 | Mendenhall et al. | Apr. 17, 1934 |
| 1,974,183 | Gunderson | Sept. 18, 1934 |
| 2,217,746 | Hawley | Oct. 15, 1940 |
| 2,320,708 | Yost | June 1, 1943 |
| 2,492,141 | Gaylord | Dec. 27, 1949 |
| 2,506,827 | Goodner | May 9, 1950 |
| 2,687,695 | Blom et al. | Aug. 31, 1954 |
| 2,796,835 | White | June 25, 1957 |
| 2,799,227 | Allen | July 16, 1957 |
| 2,809,590 | Brown | Oct. 15, 1957 |
| 2,810,348 | White | Oct. 22, 1957 |